United States Patent [19]

Atteck

[11] 3,755,038
[45] Aug. 28, 1973

[54] METHOD OF MAKING STRUCTURAL MATERIAL

[76] Inventor: Susanne Klara Atteck, 39th St. Pauls Ave., Kenton, Harrow, England

[22] Filed: May 12, 1971

[21] Appl. No.: 142,514

[63] Continuation-in-part of Ser. No. 854,853, Sept. 3, 1969, abandoned.

[52] U.S. Cl.............. 156/197, 156/210, 156/470, 161/137
[51] Int. Cl............................................. B32b 3/12
[58] Field of Search .......... 161/134–137, 127, 129; 156/197, 210, 470, 471; 144/314 A; 320, 255; 29/121 A; 113/116 A

[56] References Cited
UNITED STATES PATENTS

| 3,066,722 | 12/1962 | Adams et al. | 156/470 |
| 2,978,006 | 4/1961 | Clemens | 161/127 X |
| 2,992,673 | 7/1961 | Bishop | 156/197 X |
| 2,769,481 | 11/1956 | Meanor et al. | 161/137 X |
| 2,644,777 | 7/1953 | Havens | 161/137 X |

FOREIGN PATENTS OR APPLICATIONS

| 616,322 | 2/1961 | Italy | 144/314 A |

Primary Examiner—Alfred L. Leavitt
Assistant Examiner—David A. Simmons
Attorney—Lackenbach & Lackenbach

[57] ABSTRACT

The specification describes the preparation of a structural material which consists of a filling of substantially sinusoidally curved strips of sheet material, sandwiched between layers of sheet material, and bonded to these outer layers. The material may be in the form of a single or multi-layer sandwich and is made using at least one rotating member having formers projecting therefrom to deform initially parallel strips into substantially sinusoidal conformation.

8 Claims, 10 Drawing Figures

Patented Aug. 28, 1973 3,755,038

SUSANNE KLARA ATTECK
INVENTOR.

By Rackenbach + Rackenbach

ATTORNEYS

Patented Aug. 28, 1973
3,755,038
2 Sheets-Sheet 2
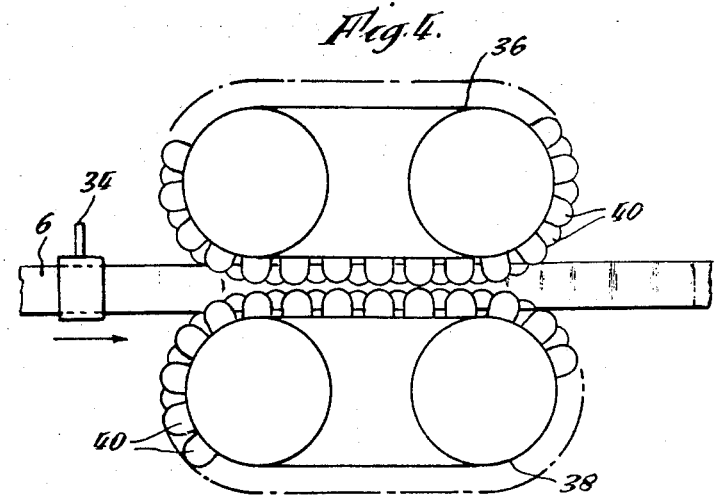
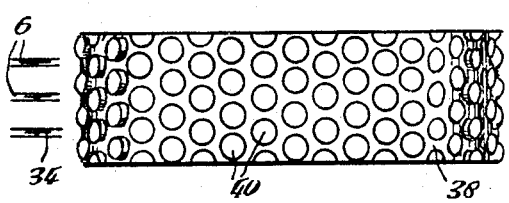
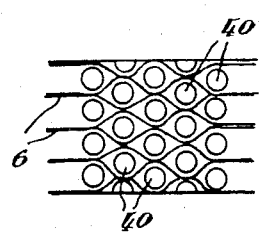
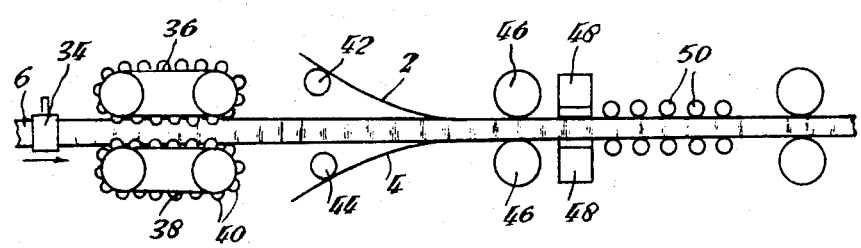
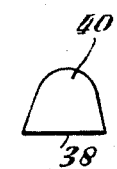
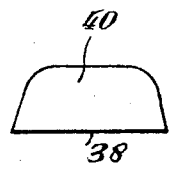
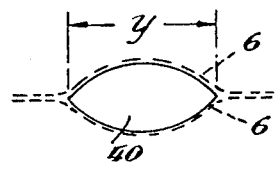
SUSANNE KLARA ATTECK
INVENTOR.
By Rachenbach & Rachenbach
ATTORNEYS

METHOD OF MAKING STRUCTURAL MATERIAL

INTRODUCTION

This invention is in part a continuation-in-part of my U.S. Pat. application Ser. No. 854,853, filed Sept. 3, 1969, now abandoned, and relates to the manufacture of the structural materials which comprise at least two substantially parallel layers of sheet material and a filling of strips of sheet material between adjacent layers the strips being arranged so that their widths are substantially perpendicular to the parallel layers, the strips being curved into substantially sinusoidal form.

BACKGROUND OF THE INVENTION

Various forms of such sandwich materials for constructional uses are known. For example, adhesive impregnated paper in the form of a honeycomb matrix has been sandwiched between rigid sheets. Alternatively, beams have been made using corrugated plywood web inserted and glued into grooves cut into top and bottom wooden flanges. The processes proposed for manufacturing such materials are complex and do not allow for continuous manufacture of long lengths of such materials. For example, methods have been proposed involving winding strips of material about a set of formers projecting from a rigid fixed plate and then removing the formers and attaching the outer layers. Of course, such a method only allows the manufacture of predetermined sizes of structural material, apart from being time consuming.

It is an object of this invention to provide a method of making such structural material which is simple to operate and can be used to provide structural material of any length in a continuous operation.

SUMMARY OF THE INVENTION

According to this invention I provide a method of making structural material in the form of a sandwich comprising at least two substantially parallel layers of sheet material, and a filling between adjacent layers of strips of sheet material arranged so that widths of the strips are substantially perpendicular to the said parallel layers, the method comprising:
— providing at least one rotatable member having formers projecting in a hexagonal close packing arrangement therefrom,
— rotating the said member in a fixed direction,
— feeding initially parallel strips of sheet material into contact with the said formers in a direction corresponding to the direction of rotation of the member,
— passing the strips between the formers whereby the strips are bent into substantially sinusoidal curves, the curves of adjacent strips being out of phase so as to abut at intervals therealong, and
— bonding the said layers of sheet material to the exposed sinusoidally disposed edges of the strips, whereby a structural material of sandwich construction is formed.

DESCRIPTION OF THE PREFERRED EMBODIMENTS

Preferably, two rotatable members are provided, each having projecting formers, so that the sheet material strips are fed into the nip provided by the rotatable members. The formers are preferably of domed shape and a particularly suitable shape is that where the formers are non-circular in cross-section but have an elongated axis parallel to direction of feed of the strips into the nip. The outer layers are preferably adhered by the use of suitable adhesive to the sinusoidally formed strips and if the adhesive is heat curable a heating station can be provided to cure the adhesive after the outer layers have been added.

BRIEF DESCRIPTION OF THE DRAWINGS

FIGS. 4 to 6 illustrate diagrammatically an alternative method in accordance with the invention, using a pair of rotatable members, FIG. 4 being a side view of the apparatus, FIG. 5 a top plan view with the upper member removed, and FIG. 6 a plan view of a section of belt with the strips passing thereover, FIG. 7 is a diagrammatic illustration of all the stages in the manufacture of the structural material, and FIGS. 8, 9 and 10 are front, side and top plan views of a modified shape of former for use in the present invention.

DESCRIPTION OF THE ILLUSTRATED METHODS

Figure 1:
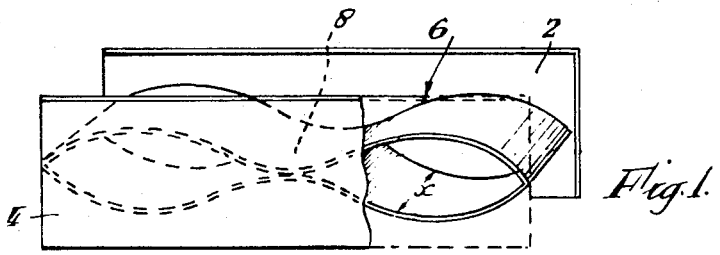
FIG. 1 is a perspective view of a small portion of structural material made in accordance with the invention showing one of the outer layers partially removed.

The structural material as shown in FIG. 1 is of a sandwich construction and has two outer layers 2 and 4 of sheet material (the outer layer 4 being partly removed) which together sandwich a filling consisting of curved strips of sheet material. The sheet and strip material may be of wood, or the strips may be of cardboard with outer sheets of cardboard or other material, with the strips 6 arranged so that their widths $x$ are perpendicular to the outer layers 2 and 4. The grain of the wood preferably runs widthwise. Such strips can conveniently be obtained by peeling logs on a veneer peeling lathe and cutting the peeled veneer into suitable widths. The strips 6 are each formed lengthwise into sinusoidal curves with adjacent strips 6 out of phase so that they abut at intervals, for example at 8. The strips 6 are adhered along their edges to the outer layers 2 and 4 by means of suitable adhesive. The material shown in FIG. 1 has one filling bounded by two outer layers, but there may of course be any number of fillings sandwiched between layers such as 2 and 4 so as to build up a multi-layer sandwich material. Such materials combine properties of lightness with high tensile strength capable of withstanding high shear and compressive forces.

Figure 2:
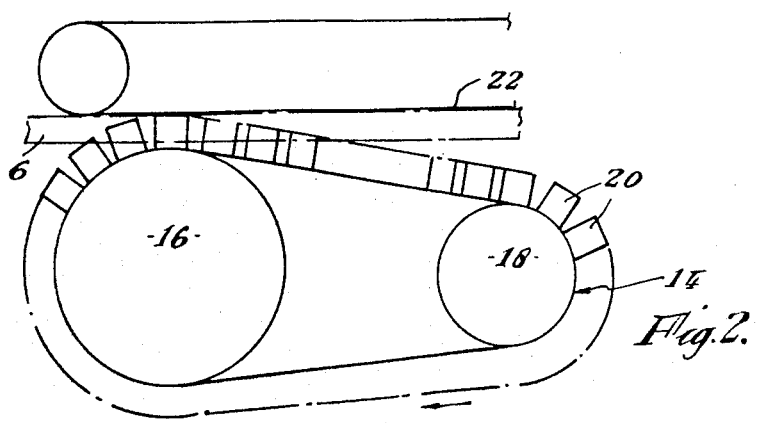
FIGS. 2 and 3 illustrate diagrammatically one method in accordance with the invention, using a single rotatable member, FIG. 2 being a top plan view and FIG. 3 being a side view.
Figure 3:
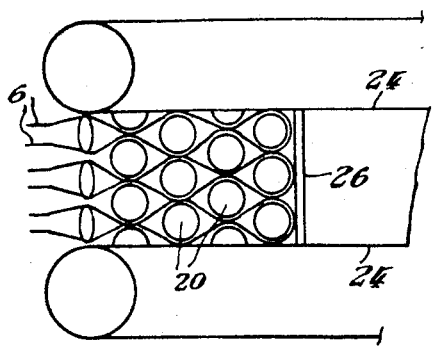

One method of forming the strips into the desired sinusoidal form is illustrated in FIGS. 2 and 3. The apparatus for forming the strips comprises a belt 14 passing round rollers 16 and 18 having projecting cylindrical formers 20 formed in a hexagonal close-packed arrangement as best shown in FIG. 3. By "hexagonal close packing" I mean that the formers are arranged so that when viewed from the side as in FIG. 3, each former is surrounded by six other formers with the formers in one row off set or staggered in relation to formers in adjacent rows so as to take advantage of the space between adjacent formers in a single row. The formers are of course spaced sufficiently apart from each other to permit the strips of material to pass therebetween.

The strip material, originally in the form of parallel strips 6 is fed into contact with the formers 20 from the left of the apparatus with the strips moving in the same sense as the belt 14. The strips 6 are thus formed into the sinusoidal form shown in FIG. 3. A guide belt 22 is used to prevent the formed material from slipping sideways off the formers 20. A second guide (not shown) may be used to protect the other side of the formed strips when they are no longer in contact with the formers 20. Further guides, such as the belts 24 (see FIG. 3) of width slightly less than the width of the strips 6 are used to protect the top and bottom of the filling as it is formed by just touching the top and bottom edges of the strips 8 as they are bent between the formers 20. To commence this continuous operation a bar 26 may be placed between the guide belts 24 and attached to the ends of the strips 8 to prevent them from springing out. The strips 6, if of wood, may be fed wet into the forming device and then subsequently passed through a drying stage and adhesive-application stage with subsequent application of the outer layers in one continuous process. The structure is then finally cut into suitable lengths. Alternatively, the filling can be cut into lengths after the drying stage and encompassed in a demountable frame before the outer layers are applied.

In the alternative method illustrated in FIGS. 4 to 7, the strips 6 are formed into their sinusoidal form by passing a series of initially parallel strips between rotating deflectors 34 which give to the strips 6 a sinusoidal motion as they are drawn into the nip between an upper and lower pair of belts 36 and 38. The belts 36 and 38 each has projecting from its surface a hexagonal close-packed arrangement of formers 40 each of cylindrical shape with a domed end portion, formers 40 on the upper belt 36 corresponding in position to those on the lower belt 38. The belts 36 and 38 rotate as indicated by the arrows so that, while in contact with the strips 6, they are moving in the same sense as the strips 6 and drawing the strip through the nip. The curved nature of the formers 40 enables them to pass freely into the spacings between the strips 6 and be withdrawn from the formed sinusoidally curved strips at the point where the strips 6 leave the belts 36 and 38. Of course the formers 40 may have other shapes, for example they may have conical rather than domed end portions or the formers may be hemispherical.

A particularly suitable shape for the formers is illustrated in FIGS. 8, 9 and 10 where a single former 40 is shown projecting from a belt 38. The former 40 is domed but is elongated so that its cross-section is non-circular and its longest axis y is parallel to the direction of feed of the strips 6, two of which are shown in dotted lines in FIG. 10. This shape of former has been found particularly satisfactory as it encourages the strips to flow easily in and out of the formers while being conformed into the sinusoidal form.

The belts 36 and 38 may be replaced by a pair of rollers having projecting formers.

As shown in FIG. 7, after the strips have been formed to provide the desired core, outer layers 2 and 4, to which adhesive has been applied at 42 and 44, are introduced above and below the strips 6 and the assembly passed beneath rollers 46 to a heating station 48, where heating (such as radio frequency or micro wave heating), is applied and then beneath a series of pressure rollers 50 to give the finished sandwich product which may be cut into convenient lengths. Radio frequency or micro wave heating is especially convenient in that they are extremely rapid and an adhesive such as urea formaldehyde can be cured in about 5 to 20 seconds. This enables a high production rate. If desired, the adhesive can be applied to the core strips 6 instead of or as well as to the sheets 2 and 4.

As will be seen, the material can be produced in a continuous piece and then cut to the size required for any particular application.

When dealing with outer sheets themselves in the form of wood veneers, these can be protected by the application of strips of hot melt adhesive to the outer layers 2 and 4 to hold the material together in case of cracks or breaks during the forming stage.

The veneers used to form the strips may be obtained by peeling logs and then cutting the peeled sheet into strips of suitable width. To help strengthen the strips for the processing to which they are subjected, lines of a suitable adhesive (for example of the hot melt type) may be applied to the sheet before it is cut into strips. The lines of adhesive will bond the strips sufficiently to protect against breakage or cracks in poor quality veneers.

It will be appreciated that the method can also be applied to the production of compound multi-layer structures. For example, two already completed honeycomb structures can be adhered to either side of a core by the above described method and the compound structure cut into suitable sizes, for example for use as beam structures.

The resultant material is of high strength to weight ratio and low density and may be used for many constructional purposes.

I claim:

1. A method of making structural material in a form of a sandwich comprising at least two substantially parallel layers of sheet material, and a filling between adjacent layers of strips of sheet material, arranged so that widths of the strips are substantially perpendicular to said parallel layers, the method comprising:

a. providing at least one rotatable member having a plurality of formers fixed to and projecting therefrom, said formers being arranged in substantially parallel rows on said rotating member, the formers of each row being in staggered relationship to the formers in the row immediately adjacent said first-mentioned row, b. rotating said member in a fixed direction transverse to said rows.

c. providing a plurality of strips of sheet material in line abreast, each strip being on edge and parallel to the other said strips with the faces of adjacent strips facing each other, d. feeding said strips lengthwise substantially into contiguity with said rotatable member in a direction corresponding to said fixed direction, whereby said faces of said strips are fed into contact with said formers and said strips are passed between said formers and whereby said strips are bent into substantially sinusoidal curves, the curves of adjacent strips being out of phase so as to abut at intervals therealong, and e. bonding layers of sheet material to the exposed sinusoidally disposed edges of said strips, whereby a structural material of sandwich construction is formed, 2. A method according to claim 1 comprising feeding the strips of sheet material into the nip provided by a pair of rotatable members.

3. A method according to claim 2 comprising providing a pair of rotatable members each having projecting formers of domed shape.

4. A method according to claim 3 wherein the domed formers are of non-circular cross-section, the greatest cross-sectional dimension being along an axis parallel to the direction of feed of the strips of sheet material into the nip.

5. A method according to claim 2 comprising applying adhesive to the sinusoidally formed strips before bonding the layers of sheet material to the strips.

6. A method according to claim 5 comprising applying a curable adhesive to the strips and passing the sandwich material through a heating station to cure the adhesive.

7. A method according to claim 2 wherein the strips are of wood.

8. A method according to claim 2 wherein the strips are of cardboard.

* * * * *